United States Patent
Ghosh (10) Patent No.: US 9,826,069 B2
(45) Date of Patent: Nov. 21, 2017

(54) WIRELESS DEVICE, METHOD, AND COMPUTER READABLE MEDIA RESTRICTION OF UPLOAD TRAFFIC IN A HIGH-EFFICIENCY WIRELESS LOCAL AREA NETWORK

(71) Applicant: Intel IP Corporation, Santa Clara, CA (US)

(72) Inventor: Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 71 days.

(21) Appl. No.: 14/747,390

(22) Filed: Jun. 23, 2015

(65) Prior Publication Data

US 2016/0219130 A1    Jul. 28, 2016

Related U.S. Application Data

(60) Provisional application No. 62/108,179, filed on Jan. 27, 2015.

(51) Int. Cl.
*H04W 48/08* (2009.01)
*H04L 29/06* (2006.01)
*H04W 74/00* (2009.01)
*H04W 84/12* (2009.01)
*H04W 48/02* (2009.01)

(52) U.S. Cl.
CPC ........... *H04L 69/22* (2013.01); *H04W 74/002* (2013.01); *H04W 48/02* (2013.01); *H04W 84/12* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2005/0036761 A1* | 2/2005 | Seo | G11B 27/034 386/241 |
| 2005/0281328 A1* | 12/2005 | Hurst | H04N 21/23424 375/240 |
| 2014/0003537 A1* | 1/2014 | Ramasubramonian | H04N 19/70 375/240.25 |
| 2015/0235633 A1* | 8/2015 | Singh | G09G 5/14 345/555 |

* cited by examiner

*Primary Examiner* — Chi H Pham
*Assistant Examiner* — Shick Hom
(74) *Attorney, Agent, or Firm* — Schwegman Lundberg & Woessner, P.A.

(57) ABSTRACT

Apparatuses, methods, and computer readable media for restriction of upload traffic in a high-efficiency wireless local-area network are disclosed. A high-efficiency (HE) wireless local area network (HEW) device including circuitry is disclosed. The circuitry may be configured to generate a HE packet comprising a first indication of whether a random access is allowed, and generate the HE packet with a second indication of a type of packet allowed in the random access, if random access is allowed. A HE station including circuitry is disclosed. The circuitry may be configured to receive a HE packet from a access point, the packet comprising an indication of whether random access is permitted during a transmission opportunity, and determine based on the HE packet whether the random access is allowed, and if the random access period is not allowed, then return to a power saving mode without decoding the rest of the HE packet.

23 Claims, 7 Drawing Sheets

WIRELESS DEVICE, METHOD, AND COMPUTER READABLE MEDIA RESTRICTION OF UPLOAD TRAFFIC IN A HIGH-EFFICIENCY WIRELESS LOCAL AREA NETWORK

This application claims the benefit of priority under 35 USC 119(e) to U.S. Provisional Patent Application Ser. No. 62/108,179, filed Jan. 27, 2015, which is incorporated herein by reference in its entirety.

TECHNICAL FIELD

Embodiments relate to transmitting and receiving packets in wireless local area networks (WLANs) including networks operating in accordance with the Institute of Electronic and Electrical Engineers (IEEE) 802.11 family of standards. Some embodiments relate to permitting random access during a transmission opportunity. Some embodiments relate to restricting the type of packets that may be transmitted and/or the type of stations that transmit within a transmission opportunity that permits random access.

BACKGROUND

One issue in wireless local area networks (WLANs) is efficiently using the wireless network. Often stations have different needs regarding their communication with a master station or access point.

Thus there are general needs for systems and methods for efficiently using the wireless medium, and in particularly, to efficiently using the wireless medium while meeting the needs of the different stations.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
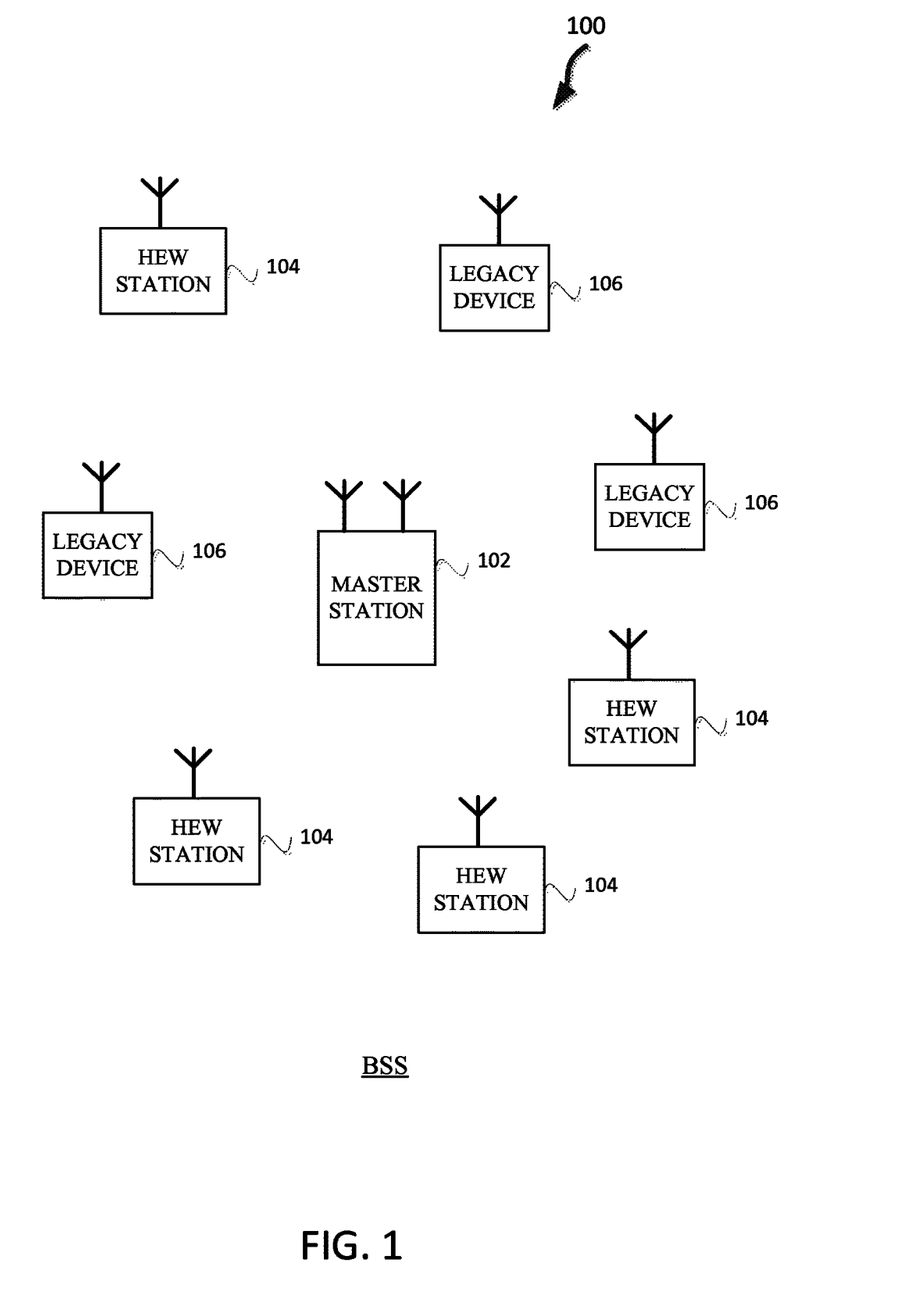
FIG. 1 illustrates a WLAN 100 in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11 a/g/ag/n/ac, or another legacy wireless communication standard. The legacy devices 106 may be STAs or IEEE STAs.

The HEW STAs 104 may be wireless transmit and receive devices such as a cellular telephone, a smartphone, a handheld wireless device, wireless glasses, a wireless watch, a wireless personal device, a tablet, or another device that may be transmitting and receiving using the IEEE 802.11 protocol such as IEEE 802.11ax or another wireless protocol. In some embodiments, the HEW STAs 104 may be termed high efficiency (HE) stations. In some embodiments the HEW STA 104 may be a power save station. For example, the HEW station 104 may be a power save station that is an Internet of things device that has limited functionality and/or limited transmission and/or battery power. In some embodiments, power save stations attempt to remain in power save mode longer than other HEW stations 104.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a sub-channel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the master station 102 and/or HEW stations 104 are configured to perform one or more of the functions and/or methods described herein in conjunction with FIGS. 1-7 such as generating, transmitting, receiving, interpreting, and operating in accordance with frames that indicate whether random access is permitted and that may indicate a type of packet that is allowed to be transmitted for the random access.

Figure 2:
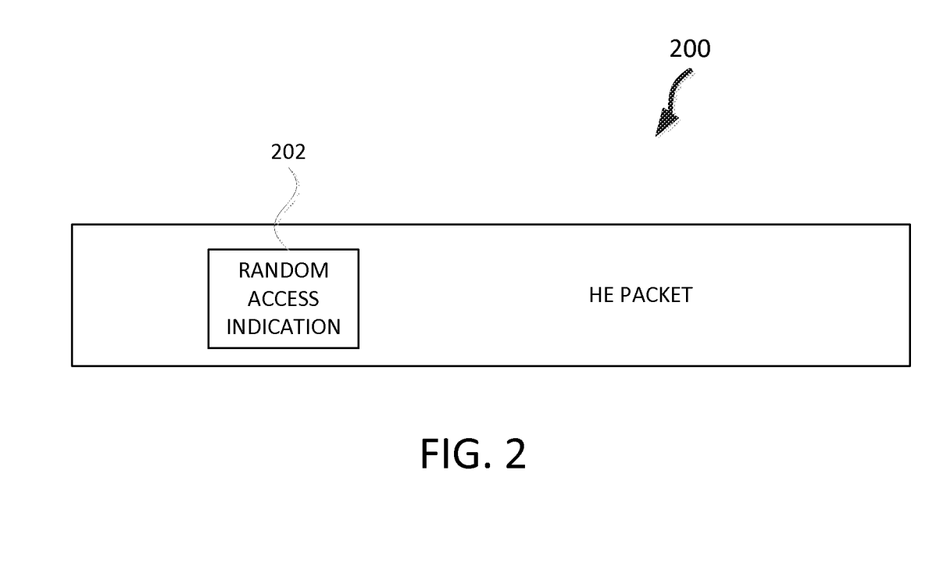
FIG. 2 illustrates a HE packet with a random access indication field in accordance with some embodiments.

FIG. 2 illustrates a HE packet 200 with a random access indication 202 field in accordance with some embodiments. The HE packet 200 may be a packet such as a trigger frame to initiate a transmission opportunity. The random access indication 202 may be a field that indicates that random access is permitted for the transmission opportunity. The random access indication 202 field may be a one bit field that indicates that random access will be permitted for the transmission opportunity. For example, a one may indicate that random access is permitted during the transmission opportunity and a zero may indicate that random access is not permitted during the transmission opportunity. The random access indication 202 field may be a part of another field.

The random access indication 202 field may provide the technical effect that HEW stations 104 that are power save stations may decode the random access indication 202 field and determine whether to decode the rest of the HE packet 200 based on the random access indication 202. For example, a power save station may decode the random access indication 202 and determine that random access is not permitted in the next transmission opportunity so the power save station may enter a power save mode and not decode the remainder of the HE packet 200. In some embodiments, if the random access indication 202 is in the physical (PHY) preamble, then the power save station does not have to decode the media access (MAC) payload and header, which may reduce the power consumed by the power save station.

In some embodiments the random access indication 202 field may be an address of a station that indicates that there is no random access for the transmission opportunity. For example, the random access indication 202 field may be a destination address that was not assigned by the master station 102. The random access indication 202 may be an address in the MAC header. The random access indication 202 may be an address that is part of a communication specification that the master station 102 and HEW stations 104 use to determine whether the transmission opportunity permits random access. The random access indication 202 may be a number of bits that is used to represent an address of a station such as 14 bits or another value of bits. In some embodiments random access indication 202 may be a group identifier that indicates whether random access is permitted in the next transmission opportunity.

Figure 3:
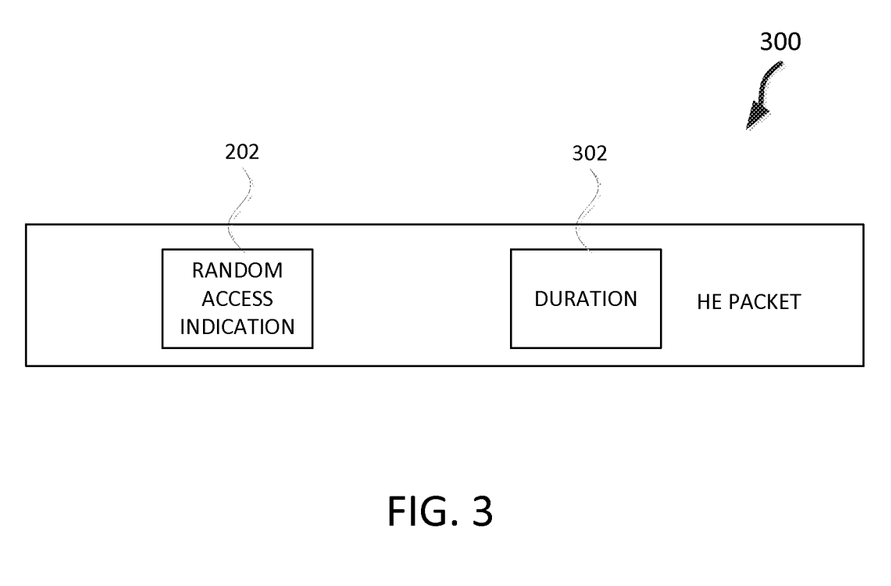
FIG. 3 illustrates a HE packet with a random access indication field and a duration field in accordance with some embodiments.

FIG. 3 illustrates a HE packet 300 with a random access indication 202 field and a duration 302 field in accordance with some embodiments. The duration 302 field may be a duration that indicates a duration in a transmission opportunity. The duration 302 field may indicate a duration for permitted packets during a transmission opportunity where random access is permitted. For example, if the random access indication 202 field indicates that a random access is permitted, then the duration 302 field may be a duration for short packets or a duration for long packets. For example, the duration 302 field may be for a duration to transmit 100 bytes for short packets or a duration for a typical management frame for long packets.

The HEW stations 104 may interpret the duration 302 field as indicating that only HEW stations 104 that are power save stations may transmit during transmission opportunities if the duration 302 field indicates a duration for short packets. The HEW stations 104 may interpret the duration 302 field as indicating that only HEW stations 104 that are unassociated HEW stations 104 may transmit during transmission opportunities if the duration 302 field indicates a duration for long packets. The HEW stations 104 may interpret the duration 302 field to indicate a maximum duration for a packet during a random access transmission opportunity.

Figure 4:
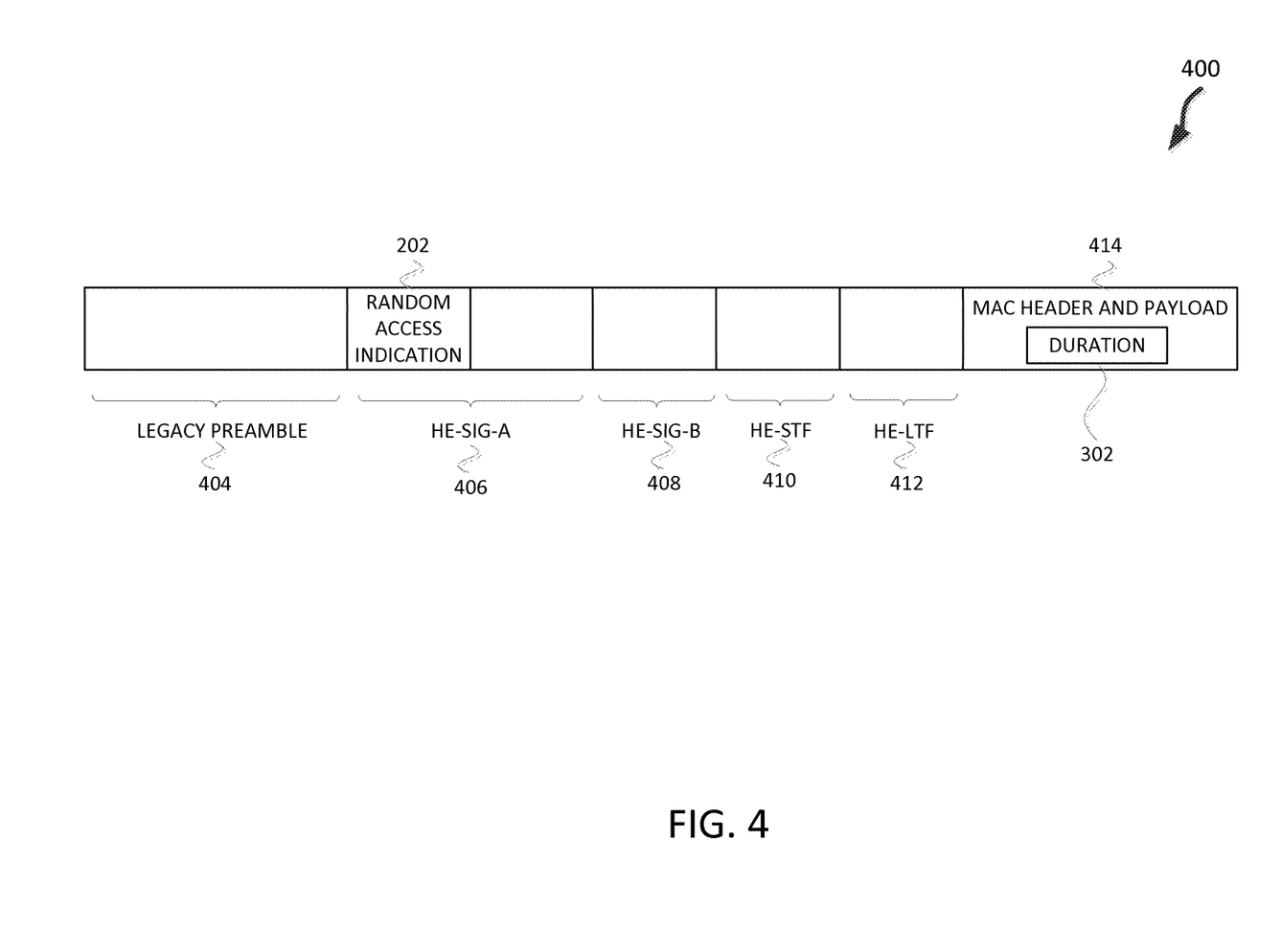
FIG. 4 illustrates a HE packet that includes a random access indication and a duration in accordance with some embodiments.

FIG. 4 illustrates a HE packet that includes a random access indication 202 and a duration 302 in accordance with some embodiments. The HE packet 400 comprises a legacy preamble 404, a HE signal A (HE-SIG-A) 406 field, a HE-SIG-B 408 field, a HE short-training field HE-STF 410, a HE long-training field HE-LTF 412, and a media access control (MAC) header and payload 414.

The legacy preamble 404 may be a preamble portion that is in accordance with one or more legacy communication protocols. The HE-SIG-A 406 field may include a random access indication 202 and one or more fields to indicate information regarding fields following the HE-SIG-A 406 field. For example, the HE-SIG-A 406 field may include a modulation and coding scheme for fields following the HE-SIG-A 406 field.

The HE-SIG-B 408 field may include one or more fields to indicate information regarding fields following the HE-SIG-B 408 field. In some embodiments the HE-SIG-B 408 field may include the random access indication 202. The HE-STF 410 may be a training field which provides one or more symbols for the receiver to use for training. The HE-LTF 412 may be a training field which provides one or more symbols for the receiver to use for training. The MAC header and payload 414 may be a portion of the HE packet 400 that includes a MAC header that may include a destination address as well as other information, and a payload that may include data. The MAC header and payload 414 may include a duration 302. In some embodiments the duration 302 may be included in an HE-SIG field such as HE-SIG-A 406 or HE-SIG-B 408.

Figure 5:
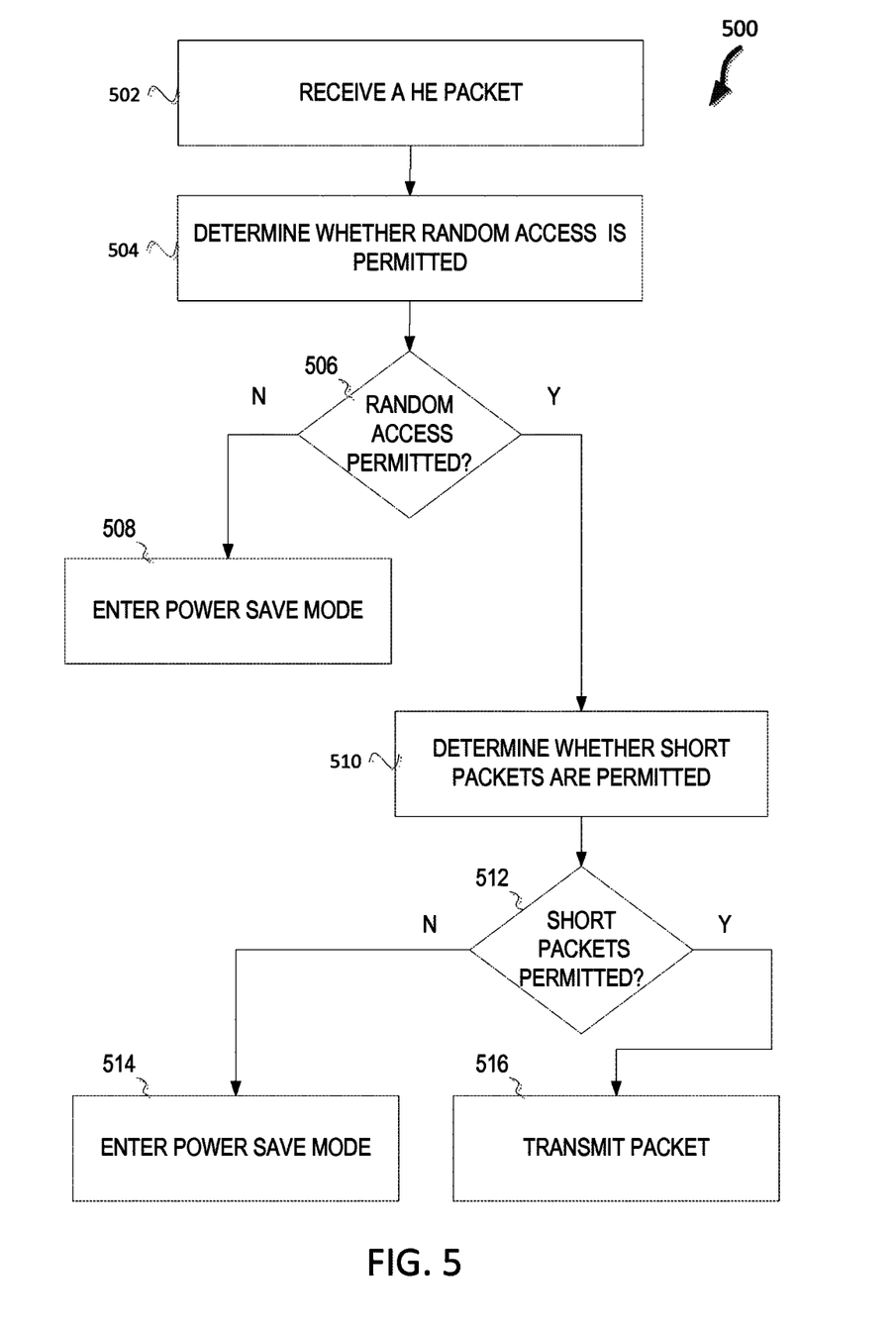
FIG. 5 illustrates a method for restricting of upload traffic in a high-efficiency wireless local area network in accordance with some embodiments.

FIG. 5 illustrates a method 500 for restricting of upload traffic in a high-efficiency wireless local area network in accordance with some embodiments. The method 500 begins at operation 502 with receiving a HE packet. For example, a HEW station 104, which may be a power save station, may receive a HE packet 200, 300, or 400. The method 500 continues at operation 504 with determining whether random access is permitted. For example, a HEW station 104, which may be a power save station, may decode the HE packet 200, 300, 400 and determine whether the random access indication 202 indicates that random access is permitted in the next transmission opportunity. The method 500 continues at operation 506 with random access permitted. The method 500 continues at operation 508 with entering power save mode, if random access is not permitted. For example, a HEW station 104, which may be a power save station, may enter a power save mode for a duration indicated in the legacy preamble 404. Another duration may be used to enter the power save mode such as a time indicated in a beacon frame.

The method 500 continues at operation 510 with determining whether short packets are permitted, if random access is permitted. For example a HEW station 104, which may be a power save station, may decode additional portions of the HE packet 200, 300, 400 and decode duration 302. The duration 302 may indicate whether or not short packets are permitted based on the value of the duration 302. For example, a duration 302 that is shorter than a longer value may indicate that short packets are permitted. For example, a duration 302 of 100 characters may indicate that short packets are permitted.

The method 500 may continue at operation 512 with short packets permitted. The method 500 may continue at operation 514 with entering power save mode, if short packets are not permitted. For example, a HEW station 104, which may be a power save station may enter a power save mode. The method 500 continues at operation 516 with transmitting a packet. For example a HEW station 104, which may be a power save station, may transmit a short packet. For example, a short packet may be 100 characters. The HEW station 104, which may be a power save station, may contend for a sub-channel of the wireless medium during the transmission opportunity before transmitting the short packet. The method 500 may end.

Figure 6:
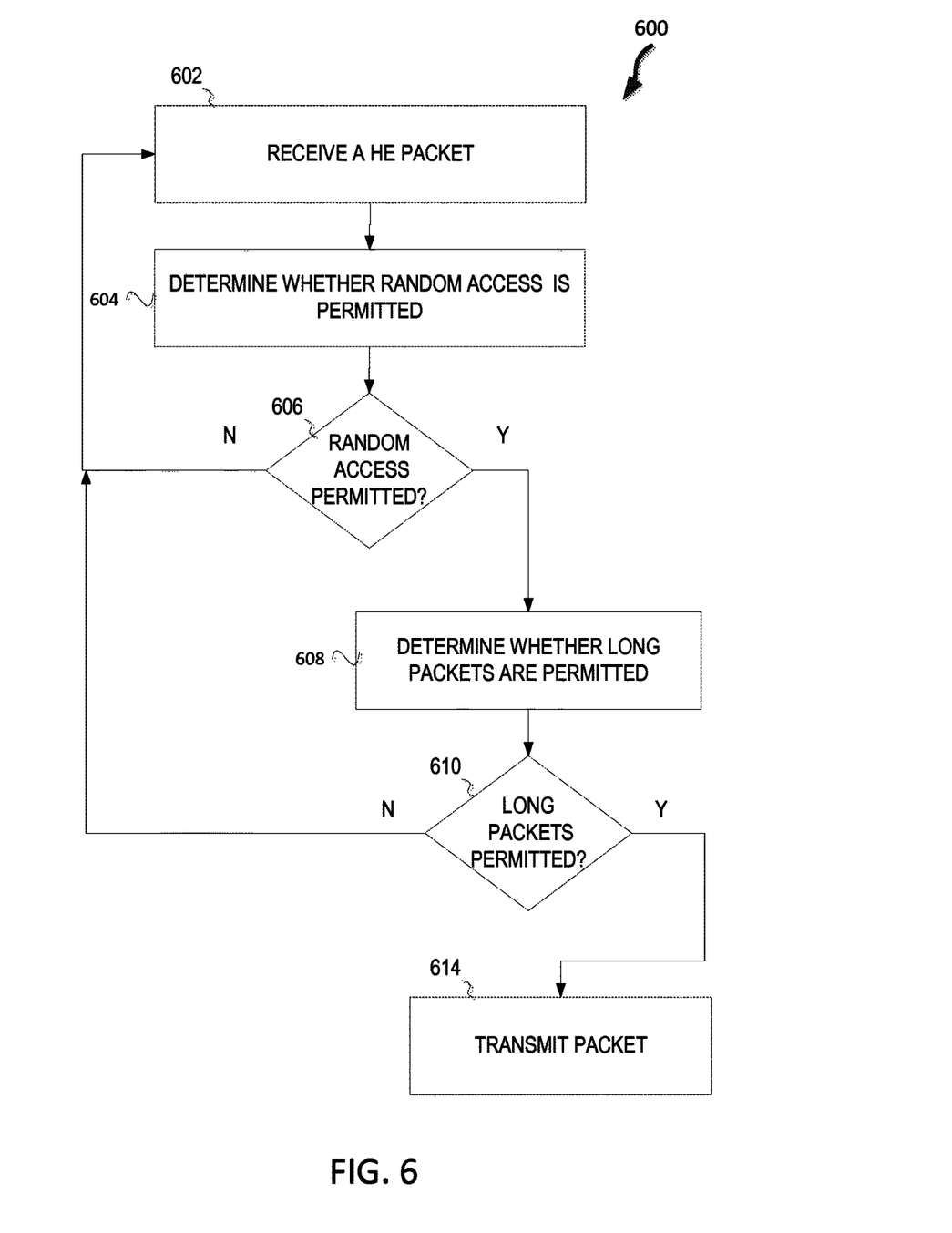
FIG. 6 illustrates a method for restricting of upload traffic in a high-efficiency wireless local area network in accordance with some embodiments.

FIG. 6 illustrates a method 600 for restricting of upload traffic in a high-efficiency wireless local area network in accordance with some embodiments. The method 600 begins at operation 602 with receiving a HE packet. For example a HEW station 104 may receive a HE packet 200, 300, 400. The method 600 continues at operation 604 with determining whether random access is permitted. For example the HEW station 104 may decode the HE packet 200, 300, 400 and determine whether random access is permitted backed on the random access indication 202. The method 600 continues at operation 606 with random access permitted. The method 600 may return to operation 602 if random access is not permitted. For example a HEW station 104 may continue to receive packets if random access is not permitted. The method 600 continues at operation 608 with determining whether long packets are permitted, if random access is permitted. For example, a HEW station 104 may decode the HE packet 200, 300, 400 to determine a duration 302.

The duration 302 may indicate whether the long packets are permitted. For example, the duration 302 may be a time that would permit a management packet to be transmitted. The method 600 continues at operation 610 with long packets permitted. The method 600 may continue at operation 602 if long packets are not permitted. For example, a HEW station 104 may continue to receive packets if long packets are not permitted. In some embodiments the HEW station 104 may set a network allocation vector (NAV) based on a duration in the preamble of the packet 200, 300, 400. The method 600 continues at operation 614 with transmitting packet if long packets are permitted. For example, a HEW station 104 may contend for the wireless medium during the transmission opportunity and transmit a management packet if the HEW station 104 gains access to the wireless medium. The HEW station 104 may attempt to access multiple sub-channels of the wireless medium.

Figure 7:
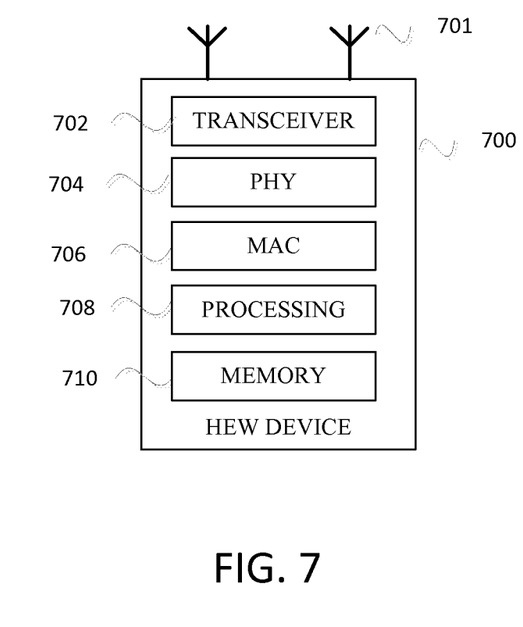
FIG. 7 illustrates a HEW device in accordance with some embodiments.

FIG. 7 illustrates a HEW device in accordance with some embodiments. HEW device 700 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 700 may be suitable for operating as master station 102 (FIG. 1) or a HEW STA 104 (FIG. 1). In accordance with embodiments, HEW device 700 may include, among other things, a transmit/receive element 701 (for example an antenna), a transceiver 702, physical (PHY) circuitry 704, and media access control (MAC) circuitry 706. PHY circuitry 704 and MAC circuitry 706 may be HEW compliant layers and may also be compliant with one or more legacy IEEE 802.11 standards. MAC circuitry 706 may be arranged to configure packets such as a physical layer convergence procedure (PLCP) protocol data unit (PPDUs) and arranged to transmit and receive PPDUs, among other things. HEW device 700 may also include circuitry 708 and memory 710 configured to perform the various operations described herein. The circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip.

In some embodiments, the MAC circuitry 706 may be arranged to contend for a wireless medium during a contention period to receive control of the medium for the HEW control period and configure an HEW PPDU. In some embodiments, the MAC circuitry 706 may be arranged to contend for the wireless medium based on channel contention settings, a transmitting power level, and a clear channel assessment (CCA) level.

The PHY circuitry 704 may be arranged to transmit the HEW PPDU. The PHY circuitry 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. The circuitry 708 may be termed processing circuitry in accordance with some embodiments. The circuitry 708 may include a processor such as a general purpose processor or special purpose processor. The circuitry 708 may implement one or more functions associated with transmit/receive elements 701, the transceiver 702, the PHY circuitry 704, the MAC circuitry 706, and/or memory 710.

In some embodiments, the circuitry 708 may be configured to perform one or more of the functions and/or methods described herein and/or in conjunction with FIGS. 1-7 such as generating, transmitting, receiving, interpreting, and operating in accordance with frames that indicate whether random access is permitted and that may indicate a type of packet that is allowed to be transmitted for random access.

In some embodiments, the transmit/receive elements 701 may be two or more antennas that may be coupled to the PHY circuitry 704 and arranged for sending and receiving signals including transmission of the HEW packets. The transceiver 702 may transmit and receive data such as HEW PPDU and packets that include an indication that the HEW device 700 should adapt the channel contention settings according to settings included in the packet. The memory 710 may store information for configuring the other circuitry to perform operations for configuring and transmitting HEW packets and performing the various operations to perform one or more of the functions and/or methods described herein and/or in conjunction with FIGS. 1-7 such as generating, transmitting, receiving, interpreting, and operating in accordance with frames that indicate whether random access is permitted and that may indicate a type of packet that is allowed to be transmitted for random access.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 700 may use 4× symbol duration of 802.11n or 802.11ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of a high-efficiency (HE) wireless local area network (HEW) device, including circuitry configured to: generate a HE packet comprising a first indication of whether random access is allowed within a transmission opportunity; and generate the HE packet with a second indication of a type of packet allowed for random access, if random access is allowed.

In Example 2, the subject matter of Example 1 can optionally include wherein the HE-packet is a trigger frame, and wherein the trigger frame defers legacy devices for a duration of the transmission opportunity.

In Example 3, the subject matter of Example 2 can optionally include where the trigger frame comprises a duration, and wherein the duration indicates the type of packet allowed for random access.

In Example 4, the subject matter of any of Examples 1-3 can optionally include where the first indication of whether random access is allowed is indicated in one from the following group: a HE signal A (HE-SIG-A) field and a HE-SIG-B field.

In Example 5, the subject matter of any of Examples 1-4 can optionally include where the first indication is a bit in a physical preamble.

In Example 6, the subject matter of any of Examples 1-5 can optionally include where the second indication indicates at least one from the following group: that shorter data packets are permitted to be transmitted for random access within the transmission opportunity and that longer data packets are permitted to be transmitted for random access with the transmission opportunity.

In Example 7, the subject matter of any of Examples 1-7 can optionally include wherein the second indication indicates that either shorter data packets are permitted to be transmitted for random access within the transmission opportunity or that longer data packets are permitted to be transmitted for random access with the transmission opportunity.

In Example 8, the subject matter of Example 7 can optionally include where the second indication indicates that shorter data packets are allowed by a shorter duration and that longer data packets are allowed by a longer duration.

In Example 9, the subject matter of any of Examples 1-8 can optionally include where the second indication indicates that either power save stations are permitted to transmit during a transmit opportunity or that unassociated stations are permitted to transmit during a transmit opportunity.

In Example 10, the subject matter of any of Examples 1-9 can optionally include where the second indication is a transmit duration in a duration field of a trigger frame, and wherein the transmit duration indicates that stations are permitted to transmit for the duration time.

In Example 11, the subject matter of any of Example 1-10 can optionally include where the HEW device is one from the following group: a HEW access point and a HEW station.

In Example 12, the subject matter of any of Examples 1-11 can optionally include where the circuitry is further configured to operate in accordance with orthogonal frequency division multiple-access (OFDMA) and Institute of Electrical and Electronic Engineers (IEEE) 802.11ax.

In Example 13, the subject matter of any of Examples 1-12 can optionally include where the circuitry further comprises processing circuitry and transceiver circuitry.

In Example 14, the subject matter of any of Examples 1-13 can optionally include memory coupled to the circuitry; and, one or more antennas coupled to the circuitry.

Example 15 is a method performed by a high-efficiency (HE) wireless local area network (WLAN) (HEW) device. The method including generating a HE packet comprising a first indication of whether random access is allowed within a transmission opportunity; and generating the HE packet with a second indication of a type of packet allowed for random access, if random access is allowed.

In Example 16, the subject matter of Example 15 can optionally include where the HE-packet is a trigger frame.

In Example 17, the subject matter of Examples 15 and 16 can optionally include where the first indication of whether random access is allowed is indicated in one from the following group: a HE signal A (HE-SIG-A) field and a HE-SIG-B field.

In Example 18, the subject matter of any of Examples 15-17 can optionally include where the first indication is a bit in a physical preamble.

Example 19 is an apparatus of a high-efficiency (HE) station comprising circuitry configured to: receive a HE packet from a HE master station, the packet comprising an indication of whether random access is permitted within a transmission opportunity; and determine based on the HE packet whether random access is permitted, and if random access is not permitted, return to a power save mode without decoding a remaining portion of the HE packet.

In Example 20, the subject matter of Example 19 can optionally include where the HE packet comprises the indication in a physical preamble, and the rest of the HE packet comprises a media access (MAC) payload and header.

In Example 21, the subject matter of Examples 19 or 20 can optionally include wherein the circuitry is further configured to: if random access is permitted, transmit a second packet to the HE master station in accordance with a second indication of the packet that indicates a restriction of the type of the second packet that may be transmitted within the transmission opportunity.

In Example 22, the subject matter of any of Examples 19-21 can optionally include where the circuitry is further configured to: transmit a second packet to the HE master station in accordance with a second indication of the HE packet that indicates a duration permitted of the second packet that may be transmitted within the transmission opportunity, if random access is permitted.

In Example 23, the subject matter of any of Examples 19-22 can optionally include memory coupled to the circuitry; and, one or more antennas coupled to the circuitry.

Example 24 is a non-transitory computer-readable storage medium that stores instructions for execution by one or more processors of a high-efficiency (HE) wireless local-area network (WLAN) (HEW) master station. The operations to configure the one or more processors to cause the HEW master station to: generate a HE packet comprising a first indication of whether random access is allowed within a transmission opportunity; and generate the HE packet with a second indication of a type of packet allowed for random access, if random access is allowed.

In Example 25, the subject matter of Example 24 can optionally include where the first indication of whether random access is allowed is indicated in one from the following group: a HE signal A (HE-SIG-A) field and a HE-SIG-B field.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) wireless local area network (HE) device, comprising circuitry including processing circuitry and memory configured to:
   generate a HE packet comprising a first indication of whether random access to transmit is allowed within a transmission opportunity; and
   generate the HE packet with a second indication of a type of packet allowed for random access, if random access is allowed; wherein the HE-packet is a trigger frame, and wherein the trigger frame defers legacy devices for a duration of the transmission opportunity.

2. The apparatus of the HE device of claim 1, wherein the trigger frame comprises a duration for a packet, and wherein the duration for the packet indicates the type of packet allowed for random access.

3. The apparatus of the HE device of claim 1, wherein the first indication of whether random access is allowed is indicated in one from the following group:
 a HE signal A (HE-SIG-A) field and a HE-SIG-B field.

4. The apparatus of the HE device of claim 1, wherein the first indication is one from the following group:
 a bit in a physical preamble and an address not allocated to a station.

5. An apparatus of a high-efficiency (HE) wireless local area network HE device, comprising circuitry configured to:
 generate a HE packet comprising a first indication of whether random access is allowed within a transmission opportunity; and
 generate the HE packet with a second indication of a type of packet allowed for random access, if random access is allowed, wherein the second indication indicates at least one from the following group:
 that shorter data packets are permitted to be transmitted for random access within the transmission opportunity and that longer data packets are permitted to be transmitted for random access with the transmission opportunity.

6. An apparatus of a high-efficiency (HE) wireless local area network HE device, comprising circuitry configured to:
 generate a HE packet comprising a first indication of whether random access is allowed within a transmission opportunity; and
 generate the HE packet with a second indication of a type of packet allowed for random access, if random access is allowed, wherein the second indication indicates that either shorter data packets are permitted to be transmitted for random access within the transmission opportunity or that longer data packets are permitted to be transmitted for random access with the transmission opportunity.

7. The apparatus of the HE device of claim 6, wherein the second indication indicates that shorter data packets are allowed by a shorter duration and that longer data packets are allowed by a longer duration.

8. An apparatus of a high-efficiency (HE) wireless local area network HE device, comprising circuitry configured to:
 generate a HE packet comprising a first indication of whether random access is allowed within a transmission opportunity; and
 generate the HE packet with a second indication of a type of packet allowed for random access, if random access is allowed, wherein the second indication indicates that either power save stations are permitted to transmit during the transmit opportunity or that unassociated stations are permitted to transmit during the transmit opportunity.

9. An apparatus of a high-efficiency (HE) wireless local area network HE device, comprising circuitry configured to:
 generate a HE packet comprising a first indication of whether random access is allowed within a transmission opportunity; and
 generate the HE packet with a second indication of a type of packet allowed for random access, if random access is allowed, wherein the second indication is a transmit duration in a duration field of a trigger frame, and wherein the transmit duration indicates that stations are permitted to transmit for the duration time.

10. The apparatus of the HE device of claim 1, wherein the HE device is one from the following group:
 a HE access point and a HE station.

11. The apparatus of the HE device of claim 1, wherein the circuitry is further configured to operate in accordance with orthogonal frequency division multiple-access (OFDMA) and Institute of Electrical and Electronic Engineers (IEEE) 802.11ax.

12. The apparatus of the HE device of claim 1, wherein the circuitry further comprises transceiver circuitry.

13. The apparatus of the HE device of claim 1, further comprising
 one or more antennas coupled to the circuitry.

14. A method performed by a high-efficiency (HE) wireless local area network (WLAN) (HE) device, the method comprising:
 generating, using processing circuitry and memory, a HE packet comprising a first indication of whether random access to transmit is allowed within a transmission opportunity; and
 generating, using the processing circuitry and the memory the HE packet with a second indication of a type of packet allowed for random access, if random access is allowed; wherein the HE-packet is a trigger frame.

15. The method of claim 14, wherein the first indication of whether random access is allowed is indicated in one from the following group:
 a HE signal A (HE-SIG-A) field and a HE-SIG-B field.

16. The method of claim 14, wherein the first indication is a bit in a physical preamble.

17. An apparatus of a high-efficiency (HE) station comprising circuitry configured to:
 receive a HE packet from a HE master station, the packet comprising an indication of whether random access to transmit is permitted within a transmission opportunity; and
 determine based on the HE packet whether random access is permitted, and if random access is not permitted, return to a power save mode without decoding a remaining portion of the HE packet, wherein the HE-packet is a trigger frame.

18. The apparatus of the HE station of claim 17, wherein the HE packet comprises the indication in a physical preamble, and the rest of the HE packet comprises a media access (MAC) payload and header.

19. An apparatus of a high-efficiency (HE) station comprising circuitry configured to:
 receive a HE packet from a HE master station, the packet comprising an indication of whether random access is permitted within a transmission opportunity; and
 determine based on the HE packet whether random access is permitted, and if random access is not permitted, return to a power save mode without decoding a remaining portion of the HE packet, wherein the circuitry is further configured to:
 if random access is permitted, transmit a second packet to the HE master station in accordance with a second indication of the packet that indicates a restriction of the type of the second packet that may be transmitted within the transmission opportunity.

20. An apparatus of a high-efficiency (HE) station comprising circuitry configured to:
 receive a HE packet from a HE master station, the packet comprising an indication of whether random access is permitted within a transmission opportunity; and
 determine based on the HE packet whether random access is permitted, and if random access is not permitted, return to a power save mode without decoding a remaining portion of the HE packet, wherein the circuitry is further configured to:
 transmit a second packet to the HE master station in accordance with a second indication of the HE packet that indicates a duration permitted of the second packet that may be transmitted within the transmission opportunity, if random access is permitted.

21. The apparatus of the HE station of claim 17, further comprising
memory coupled to the circuitry; and
one or more antennas coupled to the circuitry.

22. A non-transitory computer-readable storage medium that stores instructions for execution by one or more processors of a high-efficiency (HE) wireless local-area network (WLAN) (HE) master station, the operations to configure the one or more processors to cause the HE master station to:
generate a HE packet comprising a first indication of whether random access to transmit is allowed within a transmission opportunity; and
generate the HE packet with a second indication of a type of packet allowed for random access, if random access is allowed wherein the HE-packet is a trigger frame.

23. The non-transitory computer-readable storage medium of claim 22, wherein the first indication of whether random access is allowed is indicated in one from the following group:
a HE signal A (HE-SIG-A) field and a HE-SIG-B field.

* * * * *

UNITED STATES PATENT AND TRADEMARK OFFICE
CERTIFICATE OF CORRECTION

PATENT NO. : 9,826,069 B2
APPLICATION NO. : 14/747390
DATED : November 21, 2017
INVENTOR(S) : Chittabrata Ghosh It is certified that error appears in the above-identified patent and that said Letters Patent is hereby corrected as shown below:

In the Claims

In Column 12, Line 16, in Claim 14, after "memory", insert --,--

Signed and Sealed this
Sixteenth Day of July, 2019

Andrei Iancu
*Director of the United States Patent and Trademark Office*